United States Patent [19]
Rice

[11] 3,852,578

[45] Dec. 3, 1974

[54] CONTROL SYSTEM AND METHOD FOR MACHINE OR PROCESS HAVING DEAD TIME

[75] Inventor: James S. Rice, Columbus, Ohio

[73] Assignee: Industrial Nucleonics Corporation, Columbus, Ohio

[22] Filed: Feb. 3, 1970

[21] Appl. No.: 8,377

[52] U.S. Cl............ 235/151.1, 235/150.1, 162/198, 162/263, 162/252
[51] Int. Cl............................ D21d 1/20, D21f 1/06
[58] Field of Search......... 235/150.1, 151.1, 151.35; 318/636; 328/151; 162/258, 198, 252, 263

[56] References Cited
UNITED STATES PATENTS

| | | | |
|---|---|---|---|
| 2,922,475 | 1/1960 | Alexander | 162/252 |
| 3,649,444 | 3/1972 | Futch, Jr. | 162/198 |

OTHER PUBLICATIONS

"Definition of Basic Paper Machine Control" Michael Grant, Submitted to TAPPI Engineering Conference 1968.
"Dynamic Modeling Techniques in the Paper Industry," by Beecher, Tappi, February 1963, Vol. 46, No. 2, pp. 117–120.
"Multi–Loop Anticipator–Computer Control Systems," by Fellows, The Paper Industry, May 1963, pp. 92–94.
"A Controller to Overcome Dead Time," by Smith, ISA Journal, February 1959, Vol. 6, No. 2, pp. 28–33.

*Primary Examiner*—Eugene G. Botz
*Attorney, Agent, or Firm*—Allan M. Lowe; C. Henry Peterson

[57] ABSTRACT

A controller for a machine or process having a transportation lag is responsive to a signal sampled at time intervals less than the time required for the transportation lag. The sampled signal is fed to a controller which drives the machine prior to completion of the time required for the transportation lag. A negative feedback loop around the controller includes a transfer function indicative of the d.c., steady state response of the machine being controlled and a positive feedback loop indicative of the total transfer function of the machine being controlled, including the transportation lag thereof. A further negative feedback loop is provided between the machine output and the controller input. In a specifically disclosed embodiment, full corrections to errors of moisture and fiber content of a fibrous sheet are made within a transportation lag between a slurry input point of a headbox and scanning gauges located downstream of a dryer.

56 Claims, 5 Drawing Figures

PATENTED DEC 3 1974

INVENTOR,
JAMES S. RICE

BY

Lowe & King
ATTORNEYS

CONTROL SYSTEM AND METHOD FOR MACHINE OR PROCESS HAVING DEAD TIME

The present invention relates generally to systems for and methods of controlling machines having transportation lags and, more particularly, to a system for and method of controlling such a machine within the period of a transportation lag.

A machine or process having a transport or transportation lag, equivalent to a dead time, is one wherein there is a significant delay between the time a control action is taken and the time when the effect of that action can be monitored. Machines for forming sheets, such as paper making plants, steel rolling mills or plastic sheet extruders, are examples of systems having a transportation lag. In such sheet, forming machines, there is usually a significant spatial displacement between the location where the process is affected by a controller for a property of the sheet material and the location of a gauge capable of monitoring that property. The displacement results in a time lag between the occurrence time of a control action and the time when the effect of that action can be measured, which lag is inversely proportional to the forward velocity of the sheet in translating between the controller and the gauge.

In many prior art controllers for machines having transportation lags, instability has been avoided by actuating controllers discontinuously, with a periodicity equal to or greater than the transport lag. In other controllers, instability has been prevented by making changes considerably less than a full correction, i.e., the correction has been responsive to a small percentage of an error between measured and set point values.

It has been generally assumed that instability would occur if, after one correction was made, a controller were again activated with full corrective action prior to the completion of the transportation lag because the effect of the one correction could not be monitored by the gauge until completion of the transportation lag.

While many controllers for systems having transportation lag have refrained from reactivating controllers within the time required for a transportation lag or others have employed less than full corrective action, a technique has been devised for enabling full corrective action within the transportation lag to be effected in response to continuously derived signals generated by a monitoring means. In particular, an article by O. J. M. Smith in the February, 1959, "I. S. A. Journal" discloses a system capable of controlling a machine having a transportation lag within the transport lag time. The technique disclosed in the article includes a controller for controlling a plant, and feedback loop means around the controller for simulating or modeling the plant. The feedback loop means includes a first transfer function equal to the transfer function of the plant, without the transport lag, and a second transfer function equal exactly to the transfer function of the plant including the effect introduced by the transport lag. A negative feedback loop is provided between the output of the plant, as actually monitored by a gauge or transducer, and the input to the controller.

While the technique disclosed in the Smith article would appear to function admirably for systems wherein the system response can be continuously monitored, it apparently does not always function in an optimum manner if the system output is sampled at time intervals less than the transport lag between the controller and the output. It appears that for many situations, if an attempt were made to eliminate errors resulting from disturbances in the machine or changes in control signals within the time between samples of the plant output, overshoot in the system response might occur. Overshoot would seem to occur because a portion of the feedback loop around the controller includes the transfer function indicative of machine response, without transport lag. If an attempt were made to preclude overshoot within the sampling interval by decreasing the gain of the controller, the response time would be decreased sufficiently to preclude completion of the control action within the sampling interval.

In accordance with the present invention, there is provided a system for controlling a machine having a transport lag and an output that is periodically sampled at time intervals less than the transport lag, wherein full corrective action can be effectively performed within a sample time. In LaPlace notation, the transport lag time, $T_2$, is represented by $e^{-sT_2}$, while the machine response is represented by $G_M(s)$. The approach is somewhat similar to that disclosed in the prior art article but includes several conceptual differences which enable it to be employed with sampled systems. In particular, a negative feedback loop is provided around a controller and includes a transfer function indicative of and modeling the d.c. steady state response of the plant, $G_M(O)$, rather than a transient response thereof, $G_M(s)$, as is the case with systems of the type disclosed in the Smith article. Systems in accordance with the present invention also include around the controller a positive feedback loop having a transfer function indicative of and modeling the plant transient response, including transportation lag, $G_M(s)e^{-sT_2}$. The modeled steady state and transient responses are averaged over a sampling interval and are applied to the controller substantially simultaneously with sampled average outputs of the plant response and sampled inputs. The controller includes means for feeding the same signal to the plant and controller during the entire sampling interval, whereby changes in the signals supplied by the controller to the plant occur only upon the termination of the sampling interval. To preclude oscillation in the system, the controller output is accumulated prior to being applied to the feedback loop around the controller. To enable adaptive models, i.e., models which change characteristic with changes in the actual plant, to be employed, the d.c. steady state feedback transfer function is provided between the controller output and the accumulator input. Thereby a finite change in the model is not reflected in the accumulator output if the controller drives the plant with a zero error signal.

The system and method of the present invention enable full corrective action to be taken within the transportation lag of a plant having outputs that must be monitored on a sampled basis because the feedback loop modeling the plant response includes an element having a transfer function indicative of the steady state response to the plant, $G_M(O)$. In contradistinction, in the technique of the Smith article for enabling controls to be taken within the transportation lag in response to continuously derived signals from the plant output, feedback elements include transfer functions indicative of only the transient response, $G_M(s)$, of the machine. I have found that it is possible to eliminate errors due to disturbances occurring within the sampling time by employing a model having an element with a transfer function indicative of the plant steady state response.

In a specific application of the concepts of the present invention, the moisture and fiber content of a fibrous sheet, such as paper, are controlled. In this application, gauge means for deriving signals indicative of the sheet moisture and fiber weight per unit area, termed bone dry basis weight, are located downstream of a dryer. The dryer is in turn located downstream of a four-drinier wire and headbox which are responsive to a water-fiber slurry. Since the rate at which the fiber-water slurry is fed to the headbox determines the amount of moisture in the sheet passing the gauging station, there is a tendency for a controller for feeding the slurry to the headbox to interact with the control taken by the dryer. Hence, in the paper making system, there are two variables which may be related to each other in the actual system, and provision must be made in modeling the system response to simulate these two possibly interacting variables.

It is preferable for the specifically disclosed paper making controller to employ a sampled output because scanning gauges are usually employed for monitoring sheet properties. These gauges derive indications of the average property of the sheet over a scan thereof across the width of the sheet. Upon completion of a scan of the gauges, the average value of the signal derived by them is sampled and fed back to the controller. Typically, the interval between adjacent sample times is on the order of one-half of the transport lag between the input of the headbox, where fiber content is controlled, and the gauging station.

It is, accordingly, an object of the present invention to provide a new and improved system for and method of controlling a machine or process having a transport lag, wherein full corrective action can be taken prior to completion of the time required for the transport lag.

Another object of the present invention is to provide a system and method for enabling fully corrective action to be taken within a transport lag of a machine from which outputs are discontinuously sampled.

Another object of the invention is to provide a system for controlling a pair of variables of a machine having a transport lag, wherein fully corrective action can be effected at time intervals less than the transport lag.

A further object of the invention is to provide a system for and method of fully correcting errors in the moisture and/or fiber weight of a fibrous sheet within the transportation lag time between the point at which fiber control can be effected and the location of gauges downstream of the dryer.

Another object of the invention is to provide a system for and method of fully correcting errors in a sheet property or properties in response to sampled outputs of scanning gauge means, wherein the control can be effected at the same rate as the sampling rate, which is less than the transport lag between a controller for the sheet and the gauge location.

The above and still further objects, features and advantages of the present invention will become apparent upon consideration of the following detailed description of several specific embodiments thereof, especially when taken in conjunction with the accompanying drawings, wherein.

Figure 1:
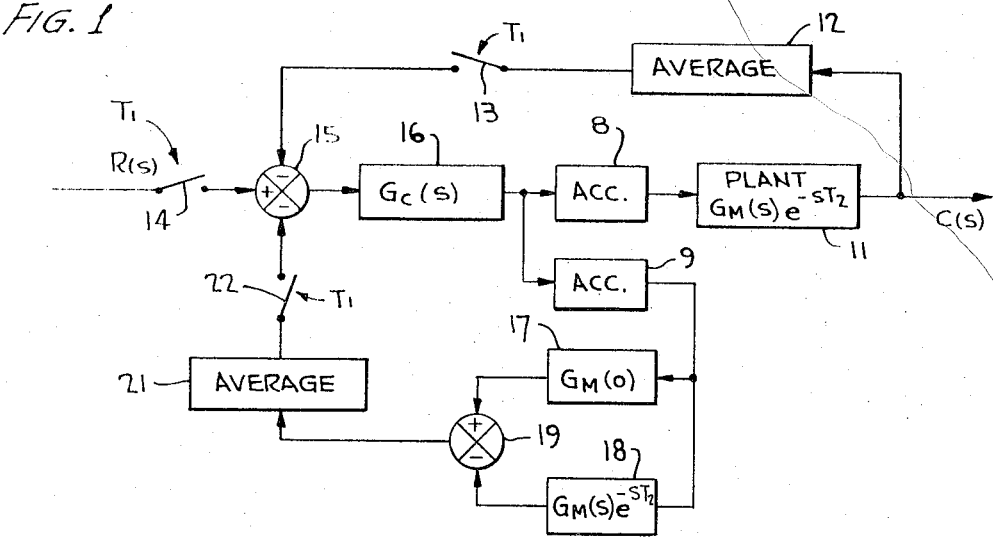
FIGS. 1 and 2 are block diagrams of different embodiments of the overall concepts of the present invention.

Reference is now made to FIG. 1 of the drawings wherein there is illustrated a system for controlling plant 11, having a dead time or transportation lag time, $T_2$. Neglecting the transportation time lag, the response of the plant can be represented in LaPlace transform notation as $G_M(s)$. The total transfer function of plant 11, including the transport lag time, can be written in LaPlace notation as $G_M(s)e^{-sT_2}$. Plant 11 derives a response, $C(s)$, that is preferably not continuously monitored but is averaged and periodically sampled to provide a control function. To this end, the output of plant 11 is applied to averaging device 12, the output of which is periodically coupled through sampling switch 13. The averaging time for device 12 is the interval between adjacent closures of sampling switch 13, whereby the output of the averaging device is indicative of the average value of $C(s)$ over a sampling interval. The period, $T_1$, of the sampling interval between closures of switch 13 is less than the transport lag time of plant 11, whereby $T_1$ is less than $T_2$.

The sampled output of plant 11 periodically coupled through switch 13 is compared in a negative feedback manner with a sampled input signal to form a signal for controlling plant 11. To this end, a set point or control input signal, $R(s)$, is periodically coupled through sampling switch 14, closed substantially simultaneously with each closure of switch 13.

The sampled signals periodically coupled through switches 13 and 14 are compared in linear combining node 15, which derives an output signal indicative of the difference between them. The difference or error signal between the sampled signals coupled through switches 13 and 14 is applied to a controller 16 for plant 11. Controller 16 has a transfer function $G_C(s)$ indicating a response time much less than: the response time of plant 11, as expressed by $G_M(s)$; the transport lag of the plant, $T_2$; or the interval between adjacent samples, $T_1$. Controller 16 provides an output to accumulators 8 and 9, each of which includes means for storing the response of the controller to the sampled output of combining node 15 for the period between adjacent samples. Thereby, the outputs of accumulators 8 and 9 can be considered as a series of rectangular waves having transitions occurring each time sampling switches 13 and 14 are closed.

The rectangular wave output signals of controller 16 are continuously applied in parallel to the inputs of accumulators 8 and 9, which can be thought of as integrators having essentially zero time constants. Accumulator 9 is employed for preventing oscillation. For generalization purposes, accumulators 8 and 9 are shown as separate elements since accumulator 8 frequently is a controlled element that inherently functions as an integrator within plant 11. For example, the difference between the present set point and an old set point for the position of a valve driven to a set point can accurately be considered as an accumulation of the output signal of controller 16 during the interval of time from the existance of the old set point to the present set point. If a controlled element in plant 11 does not inherently function as an accumulator, a single accumulator can replace illustrated accumulators 8 and 9 to perform the same function.

To enable a full correction to be made to plant 11 within the transport time lag $T_2$ and at each sampling interval $T_1$, a feedback loop responsive to accumulator 9 is provided around controller 16. The feedback loop includes a negative feedback portion having a response indicative of the d.c. steady state response of plant 11, $G_M(O)$, neglecting the plant transportation lag and a positive feedback portion having a transfer function indicative exactly of the transfer function, $G_M(s)e^{-sT_2}$, of plant 11 including the transport lag. The summed responses of the positive and negative feedback loops are averaged over the sampling time and the average values are applied back to the input of controller 16 simultaneously with closure of switches 13 and 14.

To these ends, the accumulated output of controller 16 derived from accumulator 9 is applied to a device 17 having a transfer function $G_M(O)$. Also responsive to the output of controller 16 is device 18 having a transfer function $G_M(s)e^{-sT_2}$, identical with the complete transfer function of plant 11. The responses of devices 17 and 18 are subtractively combined in node 19, the output of which feeds averaging network 21, having an averaging time equal to the interval between adjacent closures of switches 13 and 14. The output of averaging device 21 is periodically applied through switch 22 to a difference input of node 15. Switch 22 is closed simultaneously with switches 13 and 14 whereby the feedback loops around controller 16 are connected to node 15 at the same time as the input $R(s)$ and the averaged output response of plant 11.

The portion of the feedback loop around controller 16 including device 17 is considered as negative feedback because of the non-polarity inverting responses of controller 16 and element 17, as well as node 19, on the output of element 17, and the subtraction properties of node 19 for the signals fed through switches 14 and 22. In contrast, the output signal of device 18 is applied as a negative input to difference node 19, whereby the cumulative differencing effects of nodes 15 and 19 and the non-inverting responses of controller 16 and device 18 result in a regenerative or positive feedback relationship between the signals applied to node 15, as coupled through sampling switches 14 and 22.

To consider the operation of the system of FIG. 1, initially consider that the system is in a steady state condition and is thereafter disturbed, either in response to a change in set point, or an internal change in the plant 11. In either case, the disturbance is equivalent, for purposes of analysis, to a change in the value of $R(s)$ periodically coupled through sampling switch 14. In response to a change in the sampled value of $R(s)$, controller 16 derives substantially instantaneously an output signal indicative of the change in $R(s)$. The outputs of accumulators 8 and 9 change substantially instantaneously in stepwise fashion in response to the change in the output of controller 16 by an amount equal to the change. The outputs of accumulators 8 and 9 remain at the new value until a different, finite, i.e., nonzero, output is derived from controller 16, at which time they again change by the amount of the controller output variation. In response to the change in the output of accumulator 9, the output of steady state model device 17 instantaneously changes value by an amount proportional to the d.c., steady state response of plant 11 to the change, and remains constant at the changed value over the sampling interval. The constant output of modeling device 17 is applied through node 19 to averaging device 21. Assuming that transport time lag $T_2$ is greater than sampling interval $T_1$, the output of device 18 will not change until an interval of time at least equal to $T_2$. Thus the output of device 18 will remain unchanged during the interval of time presently being considered.

Upon completion of a sampling interval, averaging device 21 derives an output having a value equal to the output of device 17 over the sampling interval. When the sampling interval is completed, switches 14 and 22 are closed and inputs are applied by them by node 15 in a subtractive manner. Node 15 at this time derives a zero output signal since $R(s)$ and the output of averaging device 21 will be equal, assuming that the gain factor of controller 16, $K_c$, and the steady state gain factor of device 17, $G_M(O)$, are related to each other by $K_c \cong 1/G_M(O)$, assuming that $R(s)$ has not changed. If it is not desired to take a complete control action during one sampling period, $K_c$ can be adjusted to be less than $1/G_M(O)$ and if some overshoot is tolerable $K_c$ can be greater than $1/G_M(o)$. However, $K_c$ cannot be greater than $2/G_M(O)$ because instability will occur.

If any further change in the value of $R(s)$ occurs in the interval between adjacent closure times of switches 14 and 22, a finite output is derived from difference node 15 and fed into controller 16. The difference is equal to the average value of $R(s)$ over the sampling interval plus the change in $R(s)$ during the interval minus the average value signal derived from device 21, which does not reflect the change in the value of $R(s)$ over the interval. To simplify the description of the operation of the system further, assume that no change in the value of $R(s)$ occurs subsequent to an initial disturbance, whereby a zero output is derived from controller 16 during the sampling interval following the interval commencing with the sampling of the change. While a zero output is derived from controller 16, accumulators 8 and 9 continue to feed plant 11 and the feedback loop around controller 16 with signals equal to those derived from them during the previous sampling interval. In response to the output of accumulator 9, element 17 continues to derive a signal having an average value equal to the input signal $R(s)$ so that when tthe next sample is taken a zero output is derived from node 15. Thereby, the negative feedback loop including element 17 stabilizes controller 16 in response to variations of $R(s)$ and enables the controller to apply signals to plant 11 at sampling times occuring more frequently than the plant transport lag.

During the first sampling interval after the change in the value of $R(s)$ was initially coupled through switch 14, no change in the response of plant 11 or device 18 occurs because the time lag of the plant and device 18 is greater than the interval between adjacent sampling closures of switches 13, 14 and 22. After the transport lag time $T_2$ has elapsed, however, identical responses are derived from plant 11 and dynamic model 18. These identical responses are averaged in devices 12 and 21 and subtracted from each other in node 15 when sampling switches 13 and 22 are closed. Thereby, compensating feedback loops are established through switch 13 and device 18 in combination with switch 22 to control the performance of plant 11 and enable it to follow changes occurring in the value of R(s) within a sampling interval.

To provide a better understanding as to the functioning of the system of FIG. 1, assume that due to an internal disturbance a positive step output is derived from plant 11 simultaneously with a first sampling time occurring. This step is propagated to the output C(s) but the effect thereof is not immediately fed back to node 15 because averaging circuit 12 does not respond immediately to it. When the next sampling time (the second sampling time) occurs, however, the output signal of averaging circuit 12 reflects the step change and it is substantially instantaneously propagated through node 15, controller 16, and accumulator 8 to plant 11 as a negative step change. The negative step change input to plant 11 causes the plant to take action within one sampling time interval to reverse the effect of the initial disturbance and to subsequently cancel it out. The negative step applied to plant 11 can completely cancel the effect of the disturbance on the controller input because of the feedback loops around controller 16. The magnitude of the step enables a full correction to be taken during one sampling interval. The feedback loop including element 17 cancels out the effect on the controller input of the initial positive disturbance at the output of plant 11 at the third sampling time. The effects on the controller input of the negative input to the plant occurring at the second sampling time are canceled out after a transport lag, $T_2$, due to the feedback loop including elemtn 18, cancelling out the resulting change in the output of plant 11, as they reflect back into node 15.

While the system shown in FIG. 1 illustrates the principles of the invention, it is not well adapted for modeling changes in the characteristics of plant 11. If a change in the plant characteristics occurs, it is reflected in variations of $G_M(s)e^{-sT_2}$ and $G_M(O)$. Since a finite, nonzero signal is usually derived from accumulator 9 this change will be reflected in the outputs of elements 17 and 18 even when a zero error signal is derived from controller 16. This causes erroneous operation of the system because the magnitude of the change in the plant characteristic is multiplied by the output of accumulator 9, which usually has a value that does not provide the desired result.

Figure 2:
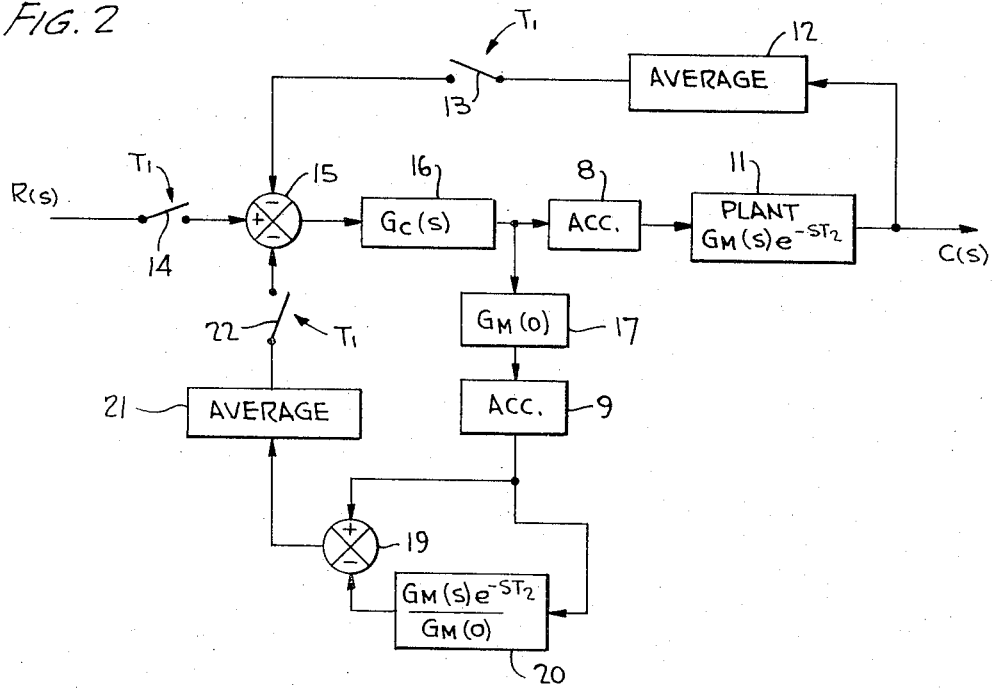

To obviate this problem, the system of FIG. 2 is provided. In FIG. 2, element 17 is connected between controller 16 and accumulator 9 to multiply the controller output by the steady state response, $G_M(O)$, of plant 11. The output of accumulator 9 is fed directly to the positive input of node 19 to form a negative feedback loop, as well as to element 20, having a transfer function equal to the transient response to plant 11 divided by the steady state response of the plant, $G_M(s)e^{-sT_2}/G_M(O)$. Since the d.c. steady state plant response, $G_M(O)$, includes only time independent gain indicating terms of the plant transient response, $G_M(s)$, the transfer function of element 20 is not usually responsive to changes in gain of the plant. Thereby, element 20 need not have adaptive properties with regard to gain factor but is provided with adaptive properties indicative of the plant transport lag, $T_2$, and time constants reflected in $G_M(s)$. It can be shown that changes to the plant transport lag and time constant coupled to model 20 are not reflected as changes in the steady state output of the model. Element 20 functions similary to element 18, FIG. 1, and is connected to the negative input of node 19 to form a positive feedback loop. In response to a change in the gain of plant 11, the transfer function of element 17 varies due to adaptive coupling between the plant and element. If a zero error signal is derived from controller 16 the change in $G_M(O)$ is not reflected in the output of element 17 or accumulator 9 to preclude the erroneous operation which may be possible in the FIG. 1 system. The remainder of the system of FIG. 2 functions as described supra with regard to FIG. 1.

In a very simple system, it can be assumed that the plant transient response is a low pass filter having a time constant $\tau$, whereby $G_M(s) = K/(1 + s\tau)$, $G_M(O) = K$, and $G_M(s)/G_M(O) = 1/(1 + s\tau)$. From this example, it is seen that the transfer function of element 17 is dependent upon the plant gain factor K, while the transfer function of element 20 is independent of the gain factor.

Figure 3:
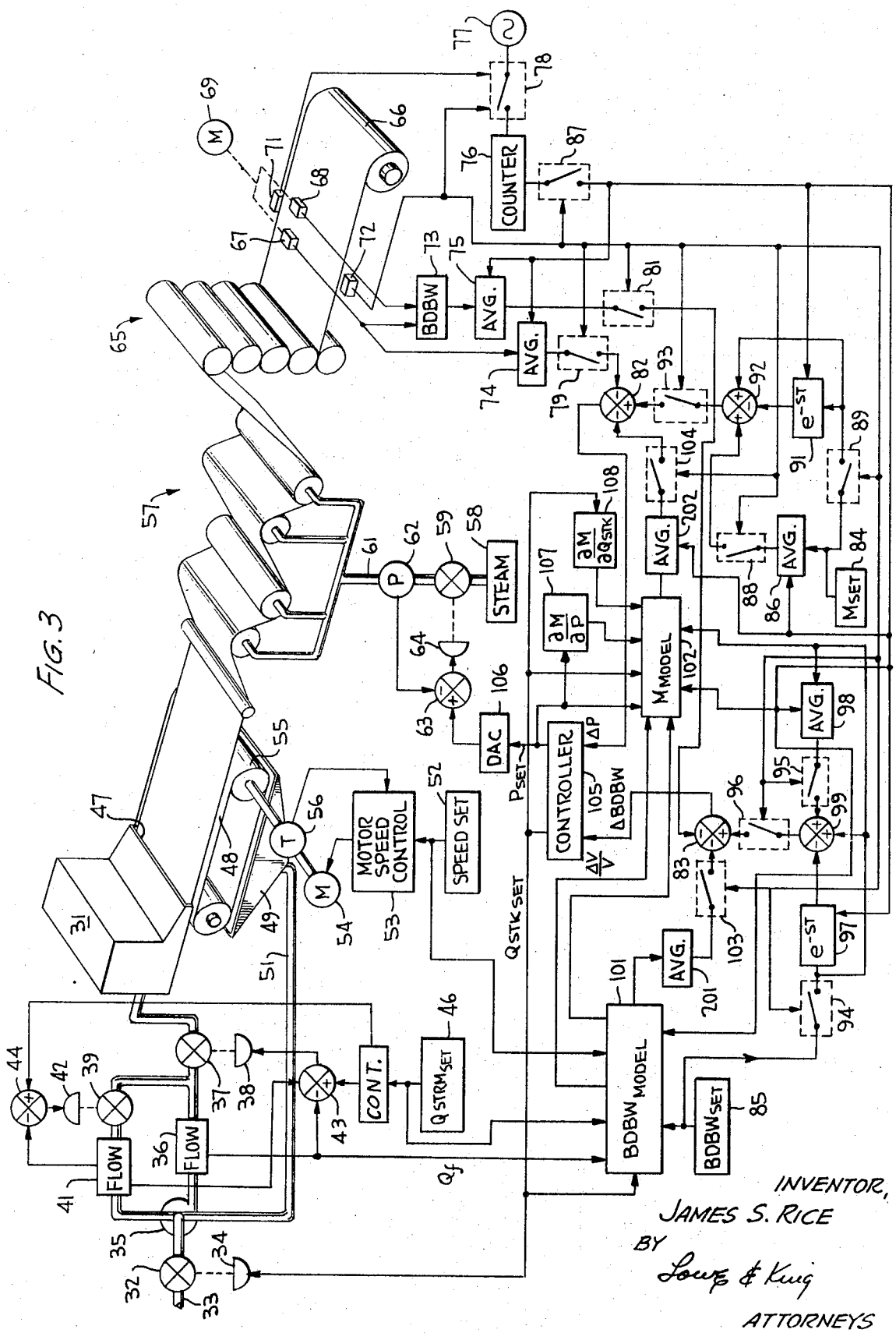
FIG. 3 is a block diagram illustrating the manner by which the teachings of the present invention are applied to control a particular paper making machine.

Reference is now made to FIG. 3 of the drawings wherein there is illustrated a block diagram indicating the manner by which the principles of the present invention are applied to a machine for fabricating a fibrous sheet, such as paper. The fibrous sheet producing machine illustrated in FIG. 3 includes the usual elements of a headbox 31 responsive to a slurry of fiber and water. The fiber-water slurry is fed to headbox 31 through thick stock valve 32, responsive to a relatively constant pressure source of thick fibrous stock, as coupled through conduit 33. The position of valve 32 is controlled in response to an electrical signal applied to actuator 34 thereof, in a manner described infra.

The fiber slurry mixture fed through valve 32 is coupled to fan pump 35, the liquid flow output of which is monitored by flow meter 36 and fed to the inlet of headbox 31 via stream valve 37. The position of valve 37 is controlled in response to an electrical signal applied to actuator 38 therefor. A portion of the fiber slurry mixture fed from fan pump 35 is returned to the fan pump via a recirculating line including valve 39. The position of valve 39 is controlled in a coordinated manner with that of valve 37 to maintain the flow rate through the latter valve constant at a set point value. To this end, the output of valve 39 is coupled back to fan pump 35 through flow meter 41. Valve 39 is controlled in response to an electrical signal applied to actuator 42 therefor. Actuators 38 and 42 are responsive to error signals derived from difference nodes 43 and 44, respectively, which in turn are responsive to output signals of flow meters 36 and 41 and set point signals for the valves, as derived from controller 45. Controller 45 is responsive to a set point signal for the rate of flow of slurry into headbox 31, derived from signal source 46, preferably of the type illustrated in my copending and commonly assigned application entitled "Coordinated Headbox Control," filed concurrently herewith, and now U.S. Pat. No. 3,703,436. The set point output signal of source 46 is fed to controller 45 that determines the opening of valve 37 relative to the opening of valve 39 to enable the desired slurry flow rate into headbox 31 to be achieved.

In response to the slurry fed thereto, a jet emerges from slice opening 47 of headbox 31. The jet emerging from slice opening 47 has the same steady state fiber flow rate as the flow rate of fibers passing through valve 32. The fiber-water slurry jet emerging from slice opening 47 collects on Fourdrinier wire 48, where the fibrous sheet is formed. Water is removed from the slurry on wire 48 and falls into wire pit 49 from which it is returned as white water to fan pump 35 via conduit 51.

Fourdrinier wire 48 is driven at a controlled velocity in response to a speed set point signal fed by source 52 to motor speed controller 53, having an output which drives motor 54. The shaft of motor 54 drives hub 55 to which Fourdrinier wire 48 is attached, whereby the velocity of the sheet and hence the transport lag of the paper making plant are substantially controlled. To maintain the wire and sheet velocity constant at the set point value thereof, tachometer 56 is provided on shaft of motor 54 and is connected in a negative feedback loop to motor speed controller 53.

The sheet taken from the end of Fourdrinier wire 48 remote from slice 47 is fed to steam dryer 57, which is illustrated as including four separate drying cans. The rate at which moisture is removed from the sheet by dryer 57 is controlled by the amount of steam fed to the cans from steam source 58 that is connected to the dryer cans via steam valve 59 and conduit 61. The steam in conduit 61 is monitored by pressure transducer 62, which derives a negative feedback signal that is fed to difference node 63, having another input responsive to a set point signal for the steam pressure valve, as described infra. The output of difference node 63 is fed to actuator 64 for steam pressure valve 59.

The dried sheet emerging from dryer 57 is fed in seriatum to rollers 65 and thence take-up roll 66. Between rollers 65 and take-up roller 66 scanning moisture and basis weight gauges 67 and 68 are provided. Preferably, moisture gauge 67 is of the capacitive type, while basis weight gauge 68 is of the nucleonic type. Gauges 67 and 68 respectively derive output signals indicative of the moisture and total weight per unit area of the sheet passing through a field of view thereof. Gauges 67 and 68 are simultaneously scanned across the width of the sheet by virtue of a common mechanical connection thereof to motor 69. At the beginning and end of each scanning period of gauges 67 and 68, signals are derived from limit switches 71 and 72, positioned in proximity to opposite edges of the sheet to mechanically engage contact engaging means (not shown) on a traversing mechanism for the gauges.

As gauges 67 and 68 are scanning across the width of the sheet, they continuously derive electrical signals commensurate with sheet moisture (M) as a fraction of the total weight and total basis weight (BW), i.e., weight per unit area. The moisture and total basis weight output signals of gauges 67 and 68 are combined in measuring circuit 73, which generates an output signal indicative of fiber weight per unit area of the sheet, a term frequently referred to in the art as bone dry basis weight (BDBW). Measuring circuit 73 combines the signals applied to it in accordance with $BW(1 - M) = BDBW$.

The moisture and bone dry basis weight output signals of gauge 67 and circuit 73 are respectively applied to averaging circuits 74 and 75, each of which has an averaging time equal to the time required for gauges 67 and 68 to scan across the width of the sheet. To this end, at the end of a scan of gauges 67 and 68 averaging circuits 74 and 75 are supplied with signals indicative of the time actually required for the gauges to scan across the width of the sheet, as derived from counter 76, and fed to the averaging circuits through sampling switch 87 that is closed in response to actuation of limit switch 72 at the end of the scan. Counter 76 is responsive to pulses periodically derived by constant frequency source 77, coupled to the counter input through switch 78 only while the gauges are scanning across the width of the sheet. Switch 78 is closed at the beginning of each scan in response to an output signal of limit switch 71 and is opened upon the completion of each scan in response to an output signal of limit switch 72.

Each of averaging circuits 74 and 75 includes means for converting analog signals derived from gauge 67 and network 73 into digital signals. The digital signals are accumulated over the length of time required for gauges 67 and 68 to cross the width of the sheet. Upon completion of the scanning cycle, limit switch 72 is activated to close switch 87 and couple the output of counter 76 into the averaging circuits 74 and 75. In response to the output of counter 76 and the accumulated moisture and bone dry basis weight signals, averaging circuits 74 and 75 divide the accumulated digital signals by an indication of scan time and thereby generate a digital signal having a value commensurate with the average gauge response over the sampling or scanning interval. The outputs of circuits 74 and 75 are sampled when switches 79 and 81 are closed, at a time slightly delayed from the closure of sampling switch 87 sufficient to enable the division operation to be performed.

The averaged moisture and bone dry basis weight digital signals coupled through sampling switches 79 and 81 are compared in linear combining nodes 82 and 83 with digital signals indicative of set points for moisture and bone dry basis weight, as derived from sources 84 and 85. (While nodes 82 and 83 are illustrated in accordance with analog notation, it is to be understood that they may be digital matrices or the accumulator of a general purpose digital computer. This is generally true of the remaining elements to be described in conjunction with FIGS. 3–5). While a change to the grade of paper being fabricated is being made, the moisture and bone dry basis weight set point values fed to sources 84 and 85 are changed while gauges 67 and 68 scan across the sheet. For on grade operation, however, operator induced changes to moisture and bone dry basis weight are coupled to sources 84 and 85 only while gauges 67 and 68 are in a non-scan condition, in engagement with switch 72 and prior to switches 89 and 94 being closed. This is to enable the full effect of operator induced changes to be coupled to the remainder of the data processing apparatus.

The output of moisture set point source 84 is applied to averaging network 86, also responsive to the output of counter 76, as coupled through switch 87 at the end of a scan of gauges 67 and 68. Averaging circuit 86, included to enable grade change to commence during a scan of gauges 67 and 68, responds to the output of moisture set point source 84 and the time indicating output of counter 76 as coupled through switch 87, in the same manner as described supra with regard to averaging circuits 74 and 75. The output of averaging circuit 86 is sampled subsequently to the averaging operation having been performed by closing switch 88 in response to activation of limit switch 72.

The moisture set point change of source 84 from scan to scan of gauges 67 and 68 during on grade operation is monitored by feeding the output of source 84 through switch 89 which is closed at the end of each scan in response to the output of limit switch 72. The signal fed through switch 89 is delayed by the scanning time between adjacent samples in delay element 91, having a delay time determined by the setting of counter 76. The delayed output of element 91 is subtracted from the sampled signal fed through switch 89 in linear combining node 92 that is also responsive to the average moisture set point value, as derived during a sampling interval. The response of linear combining node 92 is sampled at the end of a scanning period, when sampling switch 93 is closed substantially simultaneously with switches 79 and 81 in response to the control signal derived by limit switch 72. The average moisture set point signal applied through node 92 to node 82 has subtracted from it the average moisture signal applied to node 82, so that the output of the node includes an error signal component indicative of the difference between the measured and set point moisture values.

The average bone dry basis weight signal periodically coupled through sampling switch 81 is compared with the average bone dry basis weight set point signal over a scan of gauges 67 and 68 in a manner identical to that for comparing the average moisture output of gauges 67 with the average moisture set point value over the scanning time. Also, changes in the bone dry basis weight set point value from scan to scan during on grade operation are calculated and combined with the average values in the same manner as indicated supra for moisture. The elements responding to the bone dry basis weight set point source 85 for performing these operations are: sampling switches 94, 95 and 96; delay element 97; averaging network 98; and linear combining network 99. These elements are responsive to the sampled output of counter 76 and a control signal from limit switch 72 in exactly the same manner as the corresponding elements associated with moisture so that a detailed description thereof is not deemed necessary.

During grade change operation, switches 89 and 94 are open circuited so that the outputs of nodes 92 and 99 are indicative solely of the moisture and bone dry basis weight set point variations averaged over a scan of gauges 67 and 68. The memory effects of delay elements 91 and 97 are not included in grade change operation because there is no need in this type of operation to measure changes in set point between adjacent scans.

Linear combining nodes 82 and 83, in addition to being responsive to sampled, monitored average values of moisture and bone dry basis weight, average values of moisture and bone dry basis weight set point and deviations in moisture and bone dry basis weight set points, are responsive to sampled signals indicative of modeled or simulated average moisture and bone dry basis weight responses. Signals which model or simulate the moisture and bone dry basis weight responses of the fibrous sheet producing machine include two components; one simulating the d.c., steady state response of the machine to changes in the machine due to disturbances and/or set point changes, without considering the transport lag time between the point where control actions for bone dry basis weight and moisture are taken and the location of gauges 67 and 68; and a second modeling the actual response (transient and steady state) of the machine to the changes, including the transport lag.

In the system of FIG. 3, the transport lag for bone dry basis weight control is the time required for stock to travel between stock valve 32 and the location of scanning gauges 67 and 68, a time on the order of 2 minutes or more. The transport lag time for the dryer as it is affected by changes in stock flow is also on the order of 2 minutes. Generally, the scanning time of gauges 67 and 68 is on the order of 1 minute.

Figure 4:
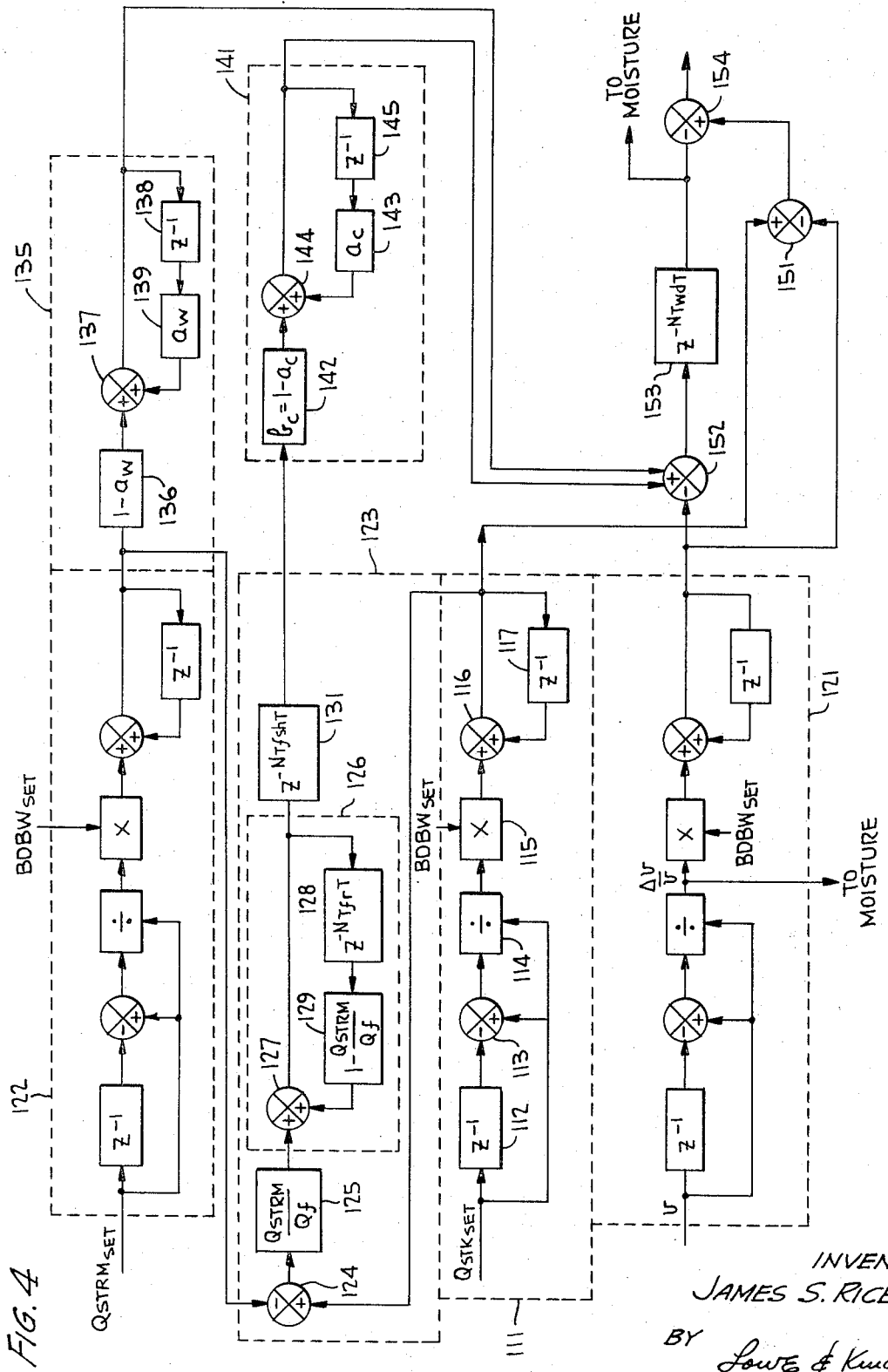
FIG. 4 is a block diagram of a bone dry basis weight model employed in the block diagram of FIG. 3.
Figure 5:
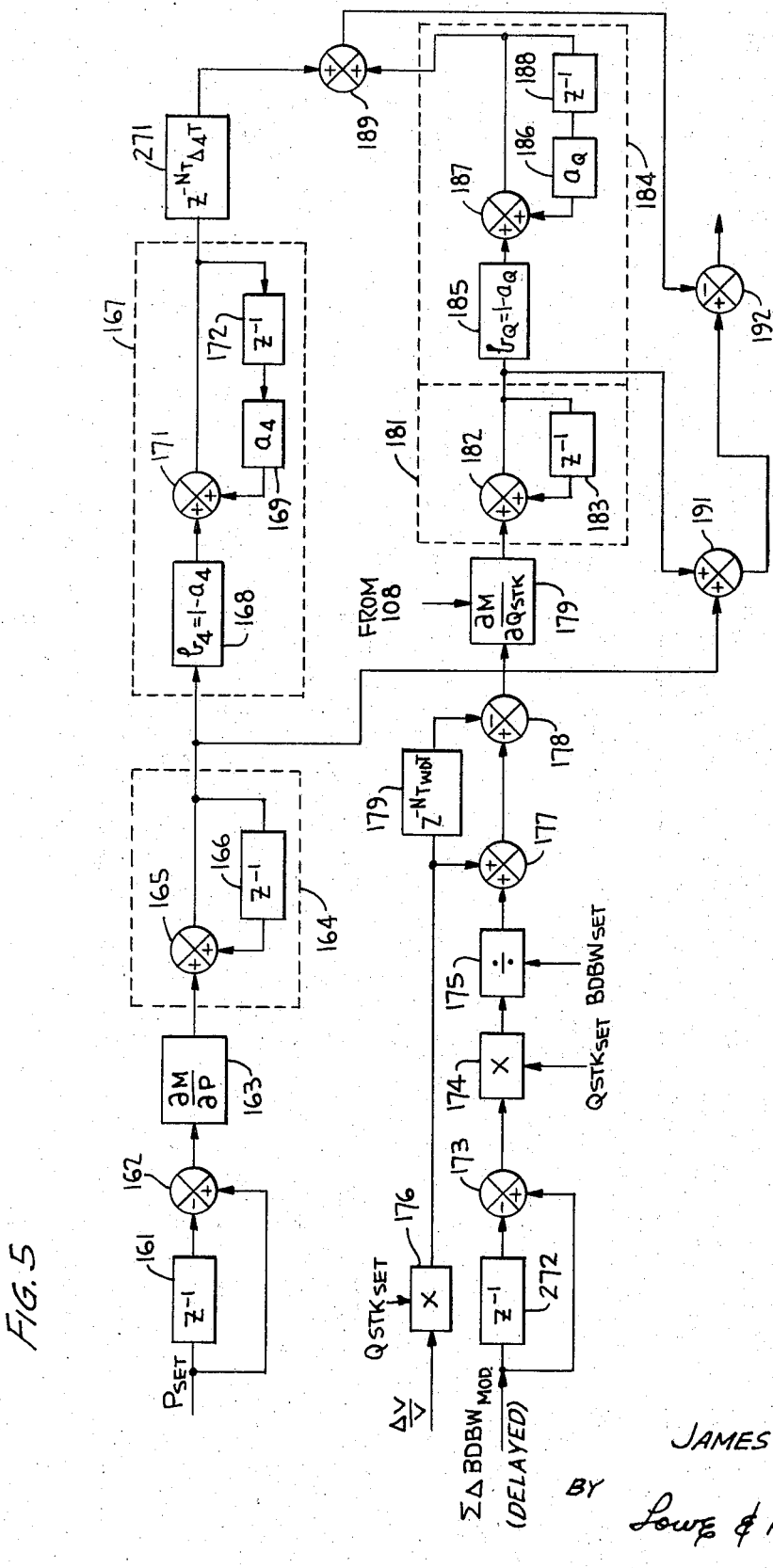
FIG. 5 is a block diagram of a moisture model employed in the system of FIG. 3.

The bone dry basis weight and moisture models 101 and 102, respectively, are illustrated in detail in FIGS. 4 and 5, to be described in detail infra. The signals derived from models 101 and 102 are averaged in networks 201 and 202 and the average values are sampled at the end of a scan of gauges 67 and 68 in response to switches 103 and 104 being closed by a control signal derived by limit switch 72. The signals derived from models 101 and 102 include two components, one modeling the steady state bone dry basis weight and moisture responses of the fibrous sheet producing facility, and a second modeling the bone dry basis weight and moisture transient responses of the facility. These signals are algebraically represented as having opposite polarities to provide for positive and negative feedback control as described in conjunction with FIGS. 1 and 2. The bone dry basis weight transient and steady state response coupled through sampling switch 103 are compared with actual system responses coupled through sampling switch 81 and bone dry basis weight input signals derived from node 99. These comparisons are made in node 83, having a positive input responsive to the output of node 99, a negative input responsive to the output of sampling switch 81 and a negative input responsive to sampling switch 103. Similarly, node 83 algebraically combines a positive input from sampling switch 93 with negative inputs from sampling switches 79 and 104. The signals derived from combining nodes 82 and 83 are indicative of error signals for controlling the steam pressure of dryer 57 and stock valve 32 setting.

The pressure and bone dry basis weight error signals derived from nodes 82 and 83 are applied to controller 105. In accordance with one preferred embodiment, controller 105 is a digital system including an algorithm for deriving set point output signals for stock valve 32 and steam pressure valve 59 so that changes in the rate at which fiber is fed to headbox 31 through stock valve 32 are compensated for by changes in the drying rate of dryer 57 to minimize changes in the moisture content of the sheet. A complete disclosure of the apparatus for performing this operation is disclosed in my co-pending and commonly assigned application entitled "Noninteracting Control of Moisture and Fiber Content of Fiber Sheet During Manufacture," Ser. No. 857,324, filed Sept. 12, 1969, now U.S. Pat. No. 3,676,295. Controller 105 is characterized as deriving digital output signals which remain constant while a zero input is applied to the controller from nodes 82 and 83. The output signals of controller 105 vary only in response to finite, nonzero inputs being applied to the controller and are incremented in response to the finite input signals. Thereby, controller 105 responds to intermittent signals derived from nodes 82 and 83 when the sampling switches are closed to derive stock valve and steam pressure valve set point output signals which remain constant between closures of the sampling switches, i.e., within a sampling interval. The output signals of controller 105 are changed only in response to nodes 82 and 83 deriving finite output signals at the sampling instants.

The stock valve set point, $Q_{STK_{SET}}$, and pressure steam valve set point, $P_{SET}$, signals derived by controller 105 are respectively applied to stock valve actuator 34 and through digital-to-analog converter 106 to difference node 63 which drives valve actuator 64. Actuator 34 for stock valve 32 is directly responsive to the digital output signal derived from controller 105 and can therefore be considered as a direct digital controller. Actuator 34 is constructed so that it follows changes in the digital signal applied thereto to set stock valve 32 in an open loop manner. In contrast, valve 59 is controlled in a closed loop manner in response to the analog output of converter 106 and a feedback signal from pressure transducer 62. Thereby, the position of valve 59 follows the actual value of the pressure set point output of controller 105.

The stock valve set point output of controller 105, in addition to being applied to valve actuator 34, is applied as a feedback signal to bone dry basis weight model 101. Model 101 is also responsive to: an indication of the rate of total mass flow into headbox 31, $Q_{STRM_{SET}}$, indicated by the signal in set point source 46; the forward sheet velocity, $v$, as it is translated across Fourdrinier wire 48, which is approximately equal to the sheet velocity through dryer 57, a quantity derived from speed set point source 52; the slurry flow rate, $Q_F$, through fan pump 35, as monitored by flow meter 36; bone dry basis weight set point, $BDBW_{SET}$, as derived from source 85; and the length of time, $T_1$, required for a scan of gauges 67 and 68, as derived from sampling switch 87. Model 101 responds to these signals to derive a signal having two components, one indicative of the d.c., steady state bone dry basis weight model of the fibrous sheet producing facility, and a second component modeling the transient response, including transportation lag, $T_2$, of the bone dry basis weight characteristics of the fibrous sheet producing machine. In addition, bone dry basis weight model 101 responds to the speed set point output of source 52 to derive an indication of the change in sheet velocity, $\Delta v/v$, over one sampling period.

The signal derived from bone dry basis weight model 101 indicative of the percentage change in sheet velocity, as well as the signal indicative of the modeled bone dry basis weight transient response of the facility, is supplied to moisture model 102. Moisture model 102 is also responsive to: the steam pressure set point, $P_{SET}$, and stock flow set point, $Q_{STK_{SET}}$, output signals of controller 105; the bone dry basis weight set point, $BDBW_{SET}$, derived from source 85; and signals indicative of rate of change of moisture with respect to pressure, $\delta M/\delta P$, and rate of change of moisture with respect to stock flow, $\delta M/\delta Q_{STK}$, as derived from sources 107 and 108, respectively. Sources 107 and 108 are respectively responsive to the steam pressure set point output of controller 105 and the stock valve set point output of controller 105. Each of sources 107 and 108 includes a memory wherein there is stored a tabulation of values indicative of a priori determined rates of change for different pressures and stock flows. In response to a particular pressure setting being derived from controller 105, source 107 derives an output value determined by a previously determined characteristic of the fibrous sheet producing machine and indicative of the rate of change of moisture with respect to pressure for a particular pressure. Similarly, source 108 responds to variations in the stock flow set point output of controller 105. In certain instances, wherein it can be validly assumed that there are not significant changes in the stock and steam pressure set points, sources 107 and 108 can be responsive to grade indicating signals fed thereto, rather than actual set point signals derived from controller 105.

Consideration will now be given to the relationship between FIGS. 2 and 3, with regard to a single control loop including only bone dry basis weight model 101.

The $R(s)$ input of FIG. 2 is the bone dry basis weight set point signal coupled to node 83 through sampling switch 96, while the plant average value signal fed to node 15 through sampling switch 13 corresponds with the output of sampling switch 81 applied to node 83 of FIG. 3. Controller 105 of FIG. 3 corresponds with controller 16 of FIG. 2. Accumulator 8 of FIG. 2 corresponds with actuator 34 and stock valve 32 of FIG. 3, while the plant 11 of FIG. 2 is the entire paper making facility of FIG. 3. The transport lag time $T_2$ of FIG. 2 is the time required for fiber passing stock valve 32 to be transformed into a sheet and pass scanning gauges 67 and 68. The time required for gauges 67 and 68 to scan across the width of the sheet is equivalent to the sampling time $T_1$ of FIG. 2.

The transfer function element 17, accumulator 9, transfer function element 20, and difference node 19 are all included in bone dry basis weight model 101. Averaging circuit 21 is shown as averaging circuit 201 in FIG. 3. The positive and negative feedback terms represented by the negative and positive inputs to node 19 are generated within the model since the model derives signal components having opposite algebraic polarity indications. The output of model 101 is coupled through switch 103, which thereby functions in an equivalent manner to switch 22.

Consideration is now given to bone dry basis weight model 101, specifically illustrated in FIG. 4. Broadly, bone dry basis weight model 101 simulates the response of the fibrous sheet producing facility for both transient and d.c., steady state properties. Simulated or modeled are the effects on bone dry basis weight due to the changes in the settings of stock valve 34 and the stream flow into headbox 31. Signals indicative of these effects are combined to derive another signal having a value indicative of the change in bone dry basis weight due to a change in the consistency of the fiber-water slurry fed to headbox 31. In deriving the signal indicative of the change in bone dry basis weight due to consistency changes, the transport lag due to recirculation through valve 39 is considered. Another factor taken into account is the change in one dry basis weight due to changes in the sheet forward velocity. Signals indicative of the change in bone dry basis weight due to stock flow and sheet velocity are combined to derive a signal simulating the steady state bone dry basis weight, i.e., modeling the bone dry basis weight of a sheet produced by the paper making facility. The signals simulating the change in bone dry basis weight due to variations in sheet velocity, headbox consistency and rate of flow of fiber through slice opening 47 of headbox 31 are combined and delayed by a time interval equal to the transport lag between slice 47 and the location of gauges 67 and 68 to derive an indication of the transient response of the fibrous sheet producing facility.

To accomplish these results, the bone dry basis weight model of FIG. 4 periodically samples, at a rate considerably greater than the rate at which gauges 67 and 68 scan across the sheet, signals derived from: bone dry basis weight set point source 85, the set point flow rate for stock valve 34, as derived from controller 105, the flow rate of liquid emerging from pump 35, as derived from meter 36, the rate of flow of fluid into headbox 31, as derived from stream flow set point source 46, and the forward velocity of the sheet, as derived from speed set point source 52. Typically, the rate at which these variables are sampled by the bone dry basis weight model 101 is once every 5 seconds. In response to the signals coupled thereto, the model is actuated once every 5 seconds, which can therefore be considered as a basic operating frequency at which operations performed therein occur. To avoid confusion, in the block diagrams of FIGS. 4 and 5, a basic delay time of the models, equal to 5 seconds, is indicated as $z^{-1}$. While the models illustrated by FIGS. 4 and 5 are shown in block diagram form, similar to that frequently employed in conjunction with analog computer type networks, it is to be understood that the blocks illustrated are actually associated with digital hardware or operations performed in a digital process control computer. As such, timing signals are applied to the various blocks at a basic rate of once every 5 seconds to perform the required calculations.

Considering now in further detail the bone dry basis weight block diagram of FIG. 4, the change in bone dry basis weight due to a change in the setting of stock valve 32 is calculated in channel 111. Channel 111 is responsive to the output of controller 105 indicative of the set point $Q_{STK_{SET}}$ for the stock valve 32, and the bone dry basis weight set point, $BDBW_{SET}$, derived from source 85. The percent change in the set point for stock valve 32 is calculated by feeding the stock valve set point signal to delay element 112, having an output which is fed to difference node 113. Another input to difference node 113 is directly responsive to the stock valve set point signal, whereby the difference node derives an output indicative of $\Delta Q_{STK}$, the change in the setting of the stock valve during any 5 second interval. The $\Delta Q_{STK}$ output of node 113 is divided by the stock valve set point input signal in divider 114, the output of which is indicative of the percentage change of the stock valve $\Delta Q_{STK}/Q_{STK}$.

The percentage change of stock valve set point output signal of divider 114 is multiplied by the bone dry basis weight set point signal derived from source 85 in multiplier 115. The output signal of multiplier 115 is accumulated in a network including summing node 116 and delay element 117. The output of summing node 116 is connected to the input of delay element 117, having an output which is returned as a positive input to node 116, which derives an output represented as $\Sigma BDBW_{SET}(\Delta Q_{STK}/Q_{STK})$. Because of the accumulator including summation node 116 and delay element 117 the output signal of the summing node is indicative of the total change in bone dry basis weight due to stock flow change.

To provide signals indicative of the percentage change in bone dry basis weight due to changes in the velocity of the sheet and the flow rate of slurry into headbox 31, channels 121 and 122 are provided. Each of channels 121 and 122 includes identical elements to those disclosed with regard to channel 111, so that a detailed description thereof is not deemed necessary. Channel 121 responds to motor speed set point source 52 and bone dry basis weight set point source 85 to derive a signal in accordance wth $\Sigma BDBW_{SET}(\Delta v/v)$, while channel 122 responds to the stream set point source 46 and bone dry basis weight set point source 85 to derive an output signal indicative of $\Sigma BDBW (\Delta Q_{STRM}/Q_{STRM})$. While deriving the BDBW $(\Delta v/v)$ signal, channel 121 derives a signal indicative of $(\Delta v/v)$ which is supplied, as seen infra, to moisture model 102. Channels 121 and 122, in modeling the effects of sheet velocity and stream flow changes, enable set point changes to thses parameters to be compensated in the model so that the transient effects of the changes as detected by gauges 67 and 68 are not coupled to the bone dry basis weight controllers, i.e., to actuator 34 for stock valve 32.

The $\Sigma BDBW (\Delta Q_{STRM}/Q_{STRM})$ and $\Sigma BDBW (\Delta Q_{STK}/Q_{STK})$ signals derived from channels 111 and 122 are combined in channel 123 which derives an output signal indicative of the modeled percent change of bone dry basis weight due to changes in the consistency of the fiber water slurry fed into headbox 31. Channel 123 effectively models the bone dry basis weight response of the system between the inlet of fan pump 35 from stock valve 32 and the inlet of headbox 31, including the recirculation through valve 39. To model this response, the outputs of channels 111 and 122 are subtractively combined in difference node 124, which derives an output signal indicative of $\Sigma BDBW (\Delta Q_{STK}/Q_{STK}) - \Sigma BDBW (\Delta Q_{STRM}/Q_{STRM})$. The output of node 124 is multiplied in element 125 by the ratio $Q_{STRM}/Q_f$ of the set point for the stream flowing into headbox 31, $Q_{STRM}$, to the flow rate of liquid derived from fan 35, $Q_f$. To these ends, element 125 is responsive to the stream set point source 46 and the output of flow meter 36 to derive a signal indicative of:

$$Q_{STRM}/Q_f[\Sigma BDBW(\Delta Q_{STK}/Q_{STK}) - \Sigma BDBW(\Delta Q_{STRM}/Q_{STRM})].$$

The output of computing element 125 is fed to accumulator 126, which includes summing node 127 and delay element 128, having a delay time equal to the time required for the slurry to flow between the outlet of fan pump 35 and the inlet of the pump through the recirculation conduit including valve 39. The output of delay element 128 is coupled to the input of multiplying element 129, responsive to the $Q_{STRM}$ and $Q_f$ outputs of source 46 and flow meter 36. Element 129 multiplies the output signal of delay element 128 in accordance with $(1 - Q_{STRM}/Q_f)$ to derive an output signal that is coupled back to a positive input of node 127. The multiplication factor $(1 - Q_{STRM}/Q_f)$ of element 129 equals the fractional flow recirculating around fan pump 35. The total effect of accumulator 126 and multiplying element 125 is to simulate or model the low pass filter type flow characteristic of the piping from fan pump 35 to the valve 37 and the recirculation loop through valve 39. The recirculation delay around fan pump 35 through valve 39 is modeled by delay 128. The low pass filter type flow characteristics caused by the recirculating loop around fan pump 35 are modeled by computing elements 125 and 129, delay 128, and node 127.

The transport lag between the inlet of fan pump 35 from stock valve 32 and the inlet of headbox 31 is modeled in a delay element 131, having an input responsive to the output of summing node 127 and a delay time equal to the transport lag. Delay element 131 derives an output signal proportional to $\Sigma$BDBW $\Delta C_{STRM}/C_{STRM}$), where $C_{STRM}$ is the consistency of the fiber-water slurry stream fed into the inlet of headbox 31 and $\Delta C_{STRM}$ is the change in the consistency of the stream fed to headbox 31. The output signal of delay element 131 thereby models the consistency variations of the fibrous sheet producing facility in feeding slurry into headbox 31.

To derive an indication of the change in bone dry basis weight due to changes in the flow rate of slurry through slice opening 47 $\Sigma$BDBW($\Delta Q_{SL}/Q_{SL}$), the output of channel 122 is applied to a network 135 which simulates the low pass filter type of characteristic of headbox 31 on the total mass flow between the headbox inlet and slice opening 47 outlet. Network 135 possesses the properties of a low pass filter by including a multiplication element 136 responsive to the output of channel 122. The signal fed to element 136 is multiplied by $(1 - a_w)$ where $a_w = e^{-\frac{t}{\tau_w}}$, $e$ is the base of natural logarithms, $t$ is the basic computer operating time, assumed to be 5 seconds, and $\tau_w$ is the time constant of headbox 31 for the total mass flow through it. The output of element 136 is applied as one input to summation network 137, having an output which is fed to delay element 138, having a delay time equal to a computer operating time. The output of delay element 138 is applied to multiplication network 139, which introduces the scale factor $e^{-5/\tau_w}$ on the output of the delay element. The output of multiplication circuit 139 is fed as a positive input to summation node 137.

The $\Sigma$BDBW ($\Delta C_{STRM}/C_{STRM}$) signal derived from channel 123 is applied to low pass filter network 141 which simulates the smoothing effects of headbox 31 on the consistency of the stream flowing between the headbox inlet and slice outlet 47. Filter 141 is substantially identical to element 135 and includes multiplying elements 142 and 143, in combination with summation node 144 and delay element 145, which are connected together in exactly the same manner as the corresponding elements of filter network 135 to derive an indication $\Sigma$ BDBW ($\Delta C_H/C_H$) of the change in bone dry basis weight due to changes in headbox consistency. The multiplication elements of network 141, however, are adjusted so that the multiplication factors of elements 142 and 143 are respectively $1 - e^{-\frac{t}{\tau_c}}$ and $e^{-\frac{t}{\tau_c}}$, where $\tau_c$ is the time constant of headbox 31 on the consistency of the fiber flowing from the headbox inlet to slice 47.

All of the steady state and transient effects on bone dry basis weight due to the characteristics of stock valve 32, fan pump 35, valves 37 and 39 and the recirculating loop including valve 39, as well as headbox 31, have been determined by the apparatus described to the present.

To derive a signal modeling the steady state bone dry basis weight response of the fibrous sheet producing machine, the outputs of channels 111 and 121 are subtractively combined in node 151, which derives an output signal, $\Sigma$ BDBW ($\Delta Q_{STK}/Q_{STK}$) − $\Sigma$ BDBW($\Delta v/v$). To derive an indication of a modeled transient response of the fibrous sheet producing machine, the output signals of channels 121, 135 and 141 are algebraically combined in node 152, which derives an output signal $\Sigma \Delta BDBW_{MOD} = \Sigma$ BDBW($\Delta Q_{SL}/Q_{SL}$) + $\Sigma$ BDBW($\Delta C_H/C_H$) − $\Sigma$ BDBW($\Delta v/v$). The output signal of node 152 is applied to delay element 153, having a delay time equal to the transport lag between slice 47 and measuring gauge 67, i.e., the time required for a fiber in the slurry to be translated from the slice opening to the gauge location.

The signal derived from delay element 153 corresponds with the output signal of element 20, FIG. 2, while the signal derived from node 151 corresponds with the output of accumulator 9. The function of accumulator 9 is performed in each of the different channels feeding both node 151 and delay element 153 by the different accumulators in the various channels. For example, in channel 111, the function of accumulator 9 is performed by the accumulator including combining node 116 and delay element 117. The modeled steady state and transient output signals of combining node 151 and delay element 153 are subtractively combined in difference node 154, which derives an output signal proportional to $\Sigma \Delta BDBW_e - \Sigma \Delta BDBW_{MOD}$, to function in the same manner as subtraction node 19, FIG. 1.

The output signal of difference node 154, indicative of the transient and steady state responses of a modeled paper making facility, is fed to averaging network 201 and thence sampling switch 103, FIG. 3, where it is combined in node 83 with signals indicative of bone dry basis weight set point and average bone dry basis weight of the sheet over the time required for a scan of gauges 67 and 68.

Consideration is now given to the apparatus for modeling the moisture properties of the fibrous sheet producing facility, by referring specifically to FIG. 5. Moisture model 102 includes means for modeling the effects of dryer 57, as well as the cross coupling effect of changes in bone dry basis weight on moisture. The cross coupling to moisture model 102 by bone dry basis weight model 101 is indicative of the modeled transient, bone dry basis weight, $\Sigma \Delta BDBW_{MOD}$, signal after it is delayed by delay element 153, FIG. 4. In addition, moisture model 102 of FIG. 5 includes means for modeling the moisture transient effect due to changes in the stock valve set point and sheet speed.

To model the performance of dryer 57, moisture model 102 is responsive to steam pressure set point source 58. The steam pressure set point is differentiated by feeding the output of source 58 to delay element 161, having an output fed to a negative input of node 162. The remaining input of node 162 is derived directly from steam pressure set point source 58, whereby the node derives an output signal, $\Delta P$, indicative of changes in the set point pressure source during each 5 second operating time interval.

The differential pressure signal, $\Delta P$, derived by node 162 is multiplied in element 163 with a signal derived from source 107 indicative of rate of change of moisture with respect to pressure, $\delta M/\delta P$, for the particular steam pressure set point derived from source 58. The $\Delta P$ ($\delta M/\delta P$) output signal of multiplier element 163 is fed to accumulator 164, which includes summing node 165 and delay element 166. The signal derived from accumulator 164 models the total change in the moisture properties of the sheet as it traverses dryer 57 for steady state conditions in response to changes in the set point of steam pressure valve 59.

The modeled steady state moisture response of dryer 57 is applied to network 167 which models the dynamic or transient response of dryer 57 to changes in the steam set point output of controller 105. Network 167 includes the usual elements for modeling a low pass filter type response, namely multipliers 168 and 169, in combination with summing node 171 and delay element 172. Network 169 multiplies the output of delay element 172 by the factor $e^{-t/\tau_D}$, where $\tau_D$ is the time constant of dryer 57 in making temperature changes on the sheet in response to pressure changes of the steam volume coupled through valve 59, while multiplier 168 scales the input thereof in accordance with the factor $1 - e^{-t/\tau_D}$. The filtered response of network 167 is delayed for a time interval modeling the transport lag between the midpoint of dryer 57 and gauge 67 by delay element 271.

To model the delayed cross coupling effect of bone dry basis weight on moisture, the $\Sigma\ \Delta BDBW_{MOD}$ is signal derived from delay element 153, FIG. 4, is differentiated in a network including delay element 272 and difference node 173. The $\Delta(\Sigma\ \Delta BDBW_{MOD})$ signal output of difference node 173 is applied to multiplier 174, having another input responsive to the stock valve set point $Q_{STK_{SET}}$ output of controller 105. The $(Q_{STK_{SET}})\Delta(\Sigma\ \Delta BDBW_{MOD})$ output signal of multiplier 174 is combined with the bone dry basis weight set point $BDBW_{SET}$ derived from source 85 in division network 175, which derives an output signal proportional to $(Q_{STK_{SET}})\Delta(\Sigma\ \Delta BDBW_{MOD})/BDBW_{SET}$ and indicative of moisture incremental changes in the sheet due to changes in bone dry basis weight.

The output signal of division network 175 is combined with a signal indicative of sheet moisture changes due to changes in the sheet velocity to simulate transient moisture changes due to sheet velocity changes. To this end, the $\Delta v/v$ signal derived from channel 121, FIG. 4, is combined in multiplying network 176 with a signal indicative of the set point of stock valve 32, $Q_{STK_{SET}}$, as derived from an output of controller 105. The $Q_{STK_{SET}}(\Delta v/v)$ output of multiplier 176 is additively combined with the output of division network 175 in summing node 177, having an output which feeds an input of subtractive node 178. The other input of subtractive node 178 is responsive to a delayed replica of the signal supplied by multiplier 176 to summing node 177. The delayed replica is derived by feeding the output of multiplier 176 to delay element 179, having a delay time equal to the transport lag of the fibrous sheet between slice 47 and gauge 67. The output signal of delay element 179 is applied to node 178 in a subtractive manner with the output of node 177. Delay element 179, in combination with nodes 177 and 178, thereby models the transient effect of changes in sheet speed on the sheet moisture property output signal of divider 175.

The output signal of difference node 178 is multiplied in element 179 by a factor indicative of the rate of change of moisture with respect to stock flow, $\delta M/\delta Q_{STK}$, as derived from source 108. The product output of element 179 is fed to accumulator 181, that includes summation node 182 and delay element 183. The output of accumulator 181 is a signal indicative of the modeled steady state moisture of the fibrous sheet due to changes in bone dry basis weight and sheet velocity. To derive an indication of modeled transient moisture changes in response to bone dry basis weight and sheet velocity changes, the output of accumulator 181 is applied to low pass filtering network 184 that models the moisture effect of dryer 57 due to changes in fiber water slurry flow rate. Filtering network 184 includes multiplying elements 185 and 186, as well as summing node 187 and delay element 188. The scaling factors of multiplying networks 185 and 186 are $1 - e^{-t/\tau_Q}$ and $e^{-t/\tau_Q}$, respectively, where $\tau_Q$ is indicative of the time constant of dryer 57 due to changes in the amount of fiber in the sheet passing through the dryer per unit time.

The output signals of delay element 171 and low pass filter type network 184 are additively combined in summing node 189, which derives an output signal modeling the transient moisture response of the fibrous sheet produced by the machine of FIG. 3.

A model of the steady state moisture properties of the sheet produced by the machine of FIG. 3 is derived by combining the outputs of accumulators 164 and 181 in summing node 191. The steady state and transient indicating output signals of nodes 189 and 191 are subtractively combined in difference node 192, which derives an output signal that is fed to averaging circuit 202 (FIG. 3) and thence through sampling switch 104 to combining node 83.

It is noted that the moisture model 102 is responsive to the transient bone dry basis weight signal derived from bone dry basis weight model 101, but not the steady state signal derived from the bone dry basis weight model. While this may result in slightly erroneous operation of the model under certain conditions, it has been found that any degradation in the performance of the moisture model appears to be tolerable under most operating conditions.

While there have been described and illustrated several specific embodiments of the invention, it will be clear that variations in the details of the embodiments specifically illustrated and described may be made without departing from the true spirit and scope of the invention as defined in the appended claims. For example, the sampling times can be greater than the transport lag although such operation obviates many of the advantages of the invention.

I claim:

1. A method of controlling an output of a machine or process having a dead time between the time a control action affecting the output is taken and the time the output is affected by the control action, comprising the steps of sampling the output at discrete time intervals which are less than the dead time, deriving a signal indicative of the error between the sampled output and a set point for the output, in response to the error signal initiating control for the machine or process, providing a model of the machine or process, coupling to said model a signal indicative of the control action for the machine or process, and modifying the response of said model with the magnitude of the error signal to determine the magnitude of the control for the machine or process, said model response having characteristics such that subsequent transient and steady state errors between the output and the setpoint in response to the control action are fully corrected at time intervals which are less than the dead time.

2. A method of controlling an output of a machine or process having a dead time between the time a control action affecting the output is taken and the time the output is affected by the control action, comprising the steps of sampling the output at discrete time intervals which are less than the dead time, deriving an error between the sampled output and a set point for the output, in response to the error actuating the control to fully correct the error at time intervals which are less than the dead time, providing a model of the machine or process, said model producing an output which includes first and second components respectively simulating the steady state and transient responses of the machine or process, and comparing the sampled output with the response of said model to actuate the control.

3. The method of claim 2 which comprises delaying, in the model, the second component for a time interval equal to the dead time.

4. The method of claim 1 which comprises actuating the control in response to a comparison of: the sampled output with a response of the model simulating the transient response and dead time of the machine or process, and a set point for the output with a response of the model simulating the steady state response of the machine or process.

5. A method of controlling an output of a machine or process having a dead time between the time a control action affecting the output is taken and the time the output is affected by the control action, comprising the steps of averaging the output for a discrete time interval less than the dead time, deriving, at the end of each interval, an indication of the error between the set point for the output and the average of the output over the interval, providing a modeled response of the machine or process, the modeled response including a model of the dead time, and in response to each of the indications initiating the control action to fully correct the error for transient and steady state responses at time intervals shorter than the dead time by modifying the error by an amount indicative of the modeled response.

6. The method of claim 1 which comprises providing the model with an output which includes first and second components respectively simulating the steady state and transient responses of the machine or process.

7. The method of claim 6 which comprises delaying, in the model, the second component for a time interval equal to the dead time.

8. The method of claim 5 which comprises actuating the control in response to a comparison of: the indication with an averaged response of the model simulating the transient response and dead time of the machine or process, and a set point for the output with a response of the model simulating the steady state response of the machine or process.

9. A method of controlling a property of a sheet formed by a machine having a transportation lag between a location where a control for the property is performed and the location of a gauge for the property comprising scanning the gauge in a direction between the sheet edges to monitor the sheet property, averaging the gauge response after the gauge has traversed, at least, a portion of the sheet and for a time interval less than the transportation lag, deriving, at the end of the interval, an indication of the error between a set point for the output and the average of the response over the interval, providing a modeled response of the machine or process, the modeled response including a model of the dead time, and in response to each indication initiating the control action to fully correct the error for transient and steady responses at intervals shorter than the time required for the transportation lag by modifying the error by an amount indicative of the modeled response.

10. The method of claim 9 which comprises providing a model of the effect of the machine on the sheet, and wherein the sampled output is modified with the output of said model to actuate the control.

11. The method of claim 10 which comprises providing the model with an output which includes first and second components respectively simulating the steady state and transient responses of the effects of the machine on the sheet.

12. The method of claim 11 which comprises delaying, in the model, the second component for a time interval equal to the transportation lag.

13. The method of claim 10 which comprises actuating the control in response to a comparison of: the indication with an averaged response of the model simulating the transient response and dead time of the effect of the machine on the sheet property, and a set point for the output with a response of the model simulating the steady state response of the sheet property.

14. A method of controlling a plurality of interacting outputs of a machine or process having a dead time between the time a control for each output is taken and the time the output is affected by the control comprising modeling the response of the machine including the dead time for each output, coupling the modeled response for one output to an input of the modeled response for another of the outputs, and in response to a comparison of each modeled response with each output actuating the controls at time intervals less than the dead time.

15. The method of claim 14 for a machine wherein the controls are susceptible to being actuated in response to each sample further including the steps of sampling the outputs at time intervals shorter than the dead time interval.

16. The method of claim 15 which comprises providing the modeled response of each output with first and second components respectively simulating the steady state and transient responses of the machine or process.

17. The method of claim 16 wherein each second component is delayed for a time interval equal to the dead time.

18. A system for controlling, in response to an input signal, a machine having a dead time, T, said machine having a transfer function, including the dead time, represented by:

$$G_M(s)e^{-sT}$$

where:
 $s$ is the LaPlace operator,
 $e$ is the base of natural logarithms, and
 $G_M$ is dependent upon the machine response,
comprising means for periodically sampling the input signal at a frequency greater than $1/T$; first feedback means responsive to the sampled signal, said first feedback means including: a controller for feeding a control signal to the machine, a negative feedback loop responsive to the controller, said negative feedback loop including means having a transfer function indicative of the steady state response of the machine, $G_M(0)$, another feedback loop responsive to the controller having a transfer function indicative of the transfer function of the machine, $G_M(s)e^{-sT}$; and a further feedback loop having a polarity opposite to that of the another feedback loop responsive to a property of the machine; said feedback loop and loop means being completed substantially simultaneously with sampling of the input signal.

19. The system of claim 18 further including means for accumulating the control signal fed to said feedback means.

20. The system of claim 19 wherein said feedback means further includes means for multiplying the control signal fed to the accumulator by the controller by a quantity indicative of the steady state transfer function $G_M(0)$.

21. A system for controlling, in response to an input signal, a machine having a dead time, T, said machine having a transfer function, including the deadband time, represented by:

$$G_M(s)e^{-sT}$$

where:
s is the LaPlace operator,
e is the base of natural logarithms, and
$G_M$ is dependent upon the machine response,
comprising first feedback means responsive to the input signal, said first feedback means including: a controller for feeding a control signal to the machine, a negative feedback loop responsive to the controller, said loop including means having a transfer function indicative solely of the steady state response of the machine, $G_M(0)$, another feedback loop responsive to the controller having a transfer function indicative of the transfer function of the machine, $G_M(s)e^{-sT}$; and a further feedback loop having a polarity opposite to that of the another feedback loop responsive to a property of the machine.

22. The system of claim 21 further including means for accumulating the control signal fed to said feedback means.

23. The system of claim 22 further including means for multiplying the control signal fed to the accumulator by the controller by a quantity indicative of the steady state transfer function $G_M(0)$.

24. A system for controlling a machine having a dead time between the time a control action is taken on a plurality of controlled variables thereof and the time output signals indicative of the variables are derived, said variables interacting with each other, said machine being responsive to input signals indicative of desired values of the variables, comprising means for modeling the steady state and transient response of the machine to control actions affecting each of said variables, means for establishing a negative feedback loop between each of said input signals and said modeled steady state responses, means for establishing opposite polarity feedback loops between each of said output signals and said modeled transient responses of the machine, the modeled transient responses including the dead time, and means for cross coupling a response between models of the variables included in the feedback loops.

25. A system for controlling a machine forming a fibrous sheet having: a headbox responsive to a slurry of fiber and water fed thereto and feeding the slurry to a moving drainage means on which the sheet is formed; a dryer for the sheet downstream of the drainage means; said system comprising gauge means monitoring the moisture and weight of the sheet downstream of the dryer for deriving first and second signals respectively indicative of the sheet moisture and weight, means for deriving a third signal indicative of the total mass flow rate of the slurry fed to the headbox, means for establishing set points for the sheet weight and moisture at the site of the gauge means, means responsive to the set points and the third signal for simulating the moisture and weight responses of the sheet at the gauge site, and means combining the simulated moisture and weight responses with the first and second signals and the set points for deriving control signals for the drying rate of the dryer and the amount of fiber fed to the headbox.

26. The system of claim 25 wherein the response simulating means includes means for deriving signal components indicative of the simulated sheet steady state and transient responses for moisture and weight.

27. The system of claim 26 further including means for delaying the simulated transient moisture and weight responses by actual machine transport lags associated therewith, and means for comparing the delayed simulated responses with the first and second signals to derive the control signals.

28. The system of claim 27 further including means for comparing the simulated sheet steady state responses with the moisture and weight set points to derive the control signals.

29. The system of claim 26 further including means for comparing the simulated sheet steady state responses with the moisture and weight set points to derive the control signals.

30. The system of claim 26 further including means for coupling one of the simulated weight components to the means simulating the moisture response.

31. The system of claim 25 further including means for scanning the gauge means in a direction between the sheet edges, means for averaging the responses of the scanning gauge means over a time interval required for the guage means to scan at least a portion of the sheet, and means for deriving the first and second signals in response to the average values at the end of each time interval.

32. The system of claim 31 wherein the response simulating means includes means for deriving signal components indicative of the average value of the simulated sheet steady state and transient responses for moisture and weight, said average value being taken over the same time interval as the interval required for the gauge means to scan the portion of the sheet.

33. The system of claim 32 further including means for delaying the simulated transient moisture and weight responses by actual machine transport lags associated therewith, and means for comparing the delayed simulated responses with the first and second signals to derive the control signals.

34. The system of claim 33 further including means for comparing the simulated sheet steady state responses with the moisture and weight set points to derive the control signals.

35. The system of claim 31 further including means for comparing the simulated sheet steady state responses with the moisture and weight set points to derive the control signals.

36. A method of controlling a machine forming a fibrous sheet having: a headbox responsive to a slurry of fiber and water fed thereto and feeding the slurry to a moving drainage means on which the sheet is formed; a dryer for the sheet downstream of the drainage means; said method comprising monitoring the moisture and weight of the sheet downstream of the dryer, deriving an indication of the mass flow rate of the slurry fed to the headbox, establishing set points for the sheet weight and moisture at the site of the gauge means, in response to the set points and the mass flow rate indication, simulating the moisture and weight responses of the sheet at the gauge site, and in response to comparisons of the simulated moisture and weight and the set points for sheet moisture and weight controlling the amount of fiber fed to the headbox and the dryer drying rate.

37. Apparatus for controlling an output of a machine or process having a dead time between the time an actuator for a controller affecting the output is energized and the time the output is affected by the actuator being energized, comprising means for sampling the output at discrete time intervals which are less than the dead time, means for deriving an error signal indicative of the difference between the sampled output and a set point for the output, means responsive to the sampled output for intermittently deriving a control signal for the actuator, a model of the machine or process responsive to the control signal, and means for modifiying the sampled output with the response of said model to repeatedly derive said control signal at time intervals less than the dead time, said model response having characteristics such that said repeatedly derived control signal for said actuator fully corrects said errors for transient and steady state responses of said machine or process and reduces said error signal to zero amplitude.

38. The apparatus of claim 37 wherein the model output includes first and second components respectively simulating the steady state and transient responses of the machine or process.

39. The apparatus of claim 38 wherein the second component is delayed for a time interval equal to the dead time.

40. The apparatus of claim 37 wherein said means for modifying includes: means for deriving a first signal component indicative of a simulated output of the transient response and deadband of the machine or process, means for comparing the first signal component with the sampled output, means for deriving a second signal component modeling the steady state output response of the machine or process, and means for comparing the second signal component with a set point for the output.

41. Apparatus for controlling an output of a machine or process having a dead time between the time an actuator for a controller affecting the output is energized and the time the output is affected by the actuator being energized comprising means for averaging the output for a discrete time interval less than the dead time interval, means for deriving, at the end of each interval, an indication of the error between a setpoint for the output and the average of the output over the interval, and means responsive to the indications for intermittently deriving a control signal for the actuator at time intervals occurring more frequently than the dead time, said control signal deriving means including means for modifying the error indication by components indicative of steady state and transient responses of the machine or process, said deriving means having sufficient gain to enable each occurrence of the control signal to reduce the error to zero amplitude.

42. The apparatus of claim 4 further including a model having an output including first and second components respectively simulating the steady state and transient responses of the machine or process.

43. The apparatus of claim 42 wherein the second component is delayed for a time interval equal to the dead time.

44. The apparatus of claim 41 wherein said means for modifying includes: means for deriving a first signal component indicative of a simulated, sampled, averaged output of the transient response and dead time of the machine or process, means for comparing the first signal component with the indication, means for deriving a second signal component modeling the steady state output response of the machine or process, and means for comparing the second signal component with a set point for the output.

45. Apparatus for controlling a property of a sheet formed by a machine having a transportation lag between the location of an actuator for a controller of the property and the location of a gauge for the property comprising means for scanning the gauge in a direction between the sheet edges to monitor the sheet property, means for averaging the gauge response after the gauge has traversed at least a portion of the sheet and for a time interval less than the transportation lag, means to derive at the end of the interval an indication of the error between a set point for the output and the average of the response over the interval, and means responsive to the indication for intermittently deriving a control signal for the actuator at time intervals occurring more frequently than the time required for the transportation lag, said control signal deriving means including means for modifying the the error indication by components indicative of steady state and transient responses of the machine or process, said deriving means having sufficient gain to enable each occurrence of the control signal to reduce the error to zero amplitude.

46. The apparatus of claim 45 wherein the modeled transient response is delayed for a time interval equal to the dead time.

47. The apparatus of claim 45 wherein said means for modifying includes: means for deriving a first signal component indicative of a simulated, sampled, averaged output of the transient response and deadband of the machine or process, means for comparing the first signal component with the indication, means for deriving a second signal component modeling the steady state output response of the machine or process, and means for comparing the second signal component with a set point for the output.

48. Apparatus for controlling a plurality of interacting outputs of a machine or process having a dead time between the time actuators for controllers for each output are energized and the effect of the actuator energizations being monitored comprising means for modeling the response of the machine or process including the dead time for each output, means for coupling the modeled response for one output to an input of the modeled response for another of the outputs, and means responsive to each modeled response and each output for intermittently deriving a control signal for each actuator at intervals occurring more frequently than the dead time.

49. The method of claim 48 further including means for sampling the outputs at time intervals occurring more frequently than the dead time interval, wherein the actuators are energized in response to each sample.

50. The apparatus of claim 49 wherein the modeled response to each output includes first and second components respectively simulating the steady state and transient responses of the machine or process.

51. The apparatus of claim 50 wherein each second component is delayed for a time interval equal to the dead time.

52. The system of claim 18 further including means for deriving a signal indicative of a set point input for the machine, and means feeding said set point indicating signal to the machine and one of the feedback loops including the transfer function for modifying one of the transfer functions and the machine in response to changes in the set point input.

53. The method of claim 1 wherein said model has transient and steady state characteristics of the machine or process.

54. The method of claim 37 wherein said model has transient and steady state charactersitics of the machine or process.

55. A method of controlling a machine or process in response to an input control signal, the machine or process having a dead time between the time a control is applied to the machine or process and the time the control is reflected in an output of the machine or process, the machine or process having a steady response and a transient response, comprising comparing the output of the machine or process with the input control signal to derive an error signal, supplying an error signal to a controller, deriving a first output signal from the controller, applying the first output signal to the machine or process, responding to the first output signal to derive a first indication for the expected steady state response of the process or machine to the first output signal and a second indication of the expected transient response of the process or machine to the first output signal, said first indication being derived substantially immediately after the first output signal is derived, said second indication being derived following the derivation of the first output signal by a time interval substantially equal to the dead time, and modifying the error signal derived by the comparison step by the first and second indications so that the modified error signal is supplied to the controller.

56. Apparatus for controlling a machine or process in response to an input control signal, the machine or process having a dead time between the time a control is applied to the machine or process and the time the control is reflected in an output of the machine or process, the machine or process having a steady response and a transient response, comprising a controller for the machine or process responsive to an error signal, said controller deriving an output control signal for the machine or process, means responsive to the output control signal for deriving a first indication for the steady state response of the machine or process and for deriving a second indication for the transient response of the machine or process, said first indication being derived substantially immediately after the first output signal is derived, said second indication being derived following the derivation of the first output signal by a time interval substantially equal to the dead time, and means combining the input control signal with the process output and both said indications for deriving the error signal.

* * * * *